United States Patent
Nusbickel

(10) Patent No.: US 6,868,543 B1
(45) Date of Patent: Mar. 15, 2005

(54) LOCATION TRANSPARENT EVENT HANDLING

(75) Inventor: Wendi L. Nusbickel, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 434 days.

(21) Appl. No.: 09/596,257

(22) Filed: Jun. 16, 2000

(51) Int. Cl.[7] .............................. G06F 3/00; G06F 9/44; G06F 9/46; G06F 13/00
(52) U.S. Cl. ........................ 719/318; 719/310; 719/330
(58) Field of Search ................................ 719/310, 318, 719/330; 709/318

(56) References Cited

U.S. PATENT DOCUMENTS

| | | | | |
|---|---|---|---|---|
| 6,073,184 A | * | 6/2000 | Couturier et al. | 709/313 |
| 6,185,611 B1 | * | 2/2001 | Waldo et al. | 709/221 |
| 6,282,568 B1 | * | 8/2001 | Sondur et al. | 709/223 |
| 6,463,446 B1 | * | 10/2002 | Wollrath et al. | 707/203 |

OTHER PUBLICATIONS

Riehle, The Event Notification Pattern—Integrating Implicit Invocation with Object–Orientation, Theory and Practice of Object System 2, 1996, pp. 43–52.*
Expersoft Corp. et al., COM/CORBA Interworking RFP Part A, OMG TC Document, Aug. 1995.*
Sun Microsystems, Remote Method Invocation Specification, 1997.*
Gamma, Helm, Johnson and Vlissides, *Design Patterns*, pp. 207–217 (Addison–Wesley Professional Computing Series 1995).

* cited by examiner

*Primary Examiner*—Thomas Lee
*Assistant Examiner*—Diem Cao
(74) *Attorney, Agent, or Firm*—Akerman Senterfitt

(57) ABSTRACT

A method for establishing a location transparent event handler can include establishing a Notifier object based upon a Notifier class in a client application for execution in a first process address space. The Notifier object can have a list of Listener objects to be notified upon an event occurrence. A Listener object can be established in a server application for execution in a second process address space separate from the first process address space. Like the Notifier object, the Listener object can be based upon a Listener class. The Listener object can define a method to be called upon the occurrence of the event. Moreover, the Listener object can be enabled to be callable from the Notifier object. Finally, a Listener object stub can be generated for the Listener object, wherein the Listener object stub can be configured to be added to the list of Listener objects in the Notifier object. Additionally, the Listener object stub can be further configured to remotely call the defined method in the Listener object in response to receiving notification of an event from the Notifier object. In consequence, upon the event occurrence, the Notifier object can traverse the list of Listener objects and can notify the Listener object stub of the event occurrence thereby creating a remote call to the defined method in the Listener object.

16 Claims, 3 Drawing Sheets

LOCATION TRANSPARENT EVENT HANDLING

BACKGROUND OF THE INVENTION

1. Technical Field

This invention relates to the field of distributed object communications and more particularly to a method for location transparent event handling.

2. Description of the Related Art

In computer programming, the term "event handling" refers to the way in which a computer program processes external and internal occurrences in a computer program. External occurrences can include keystrokes, mouse-clicks and externally sensed events, for example, digital data generated by an A/D converter linked to an external transducer. Conversely, internal occurrences can include internally generated events such as time-out conditions or manually created events. Event handling techniques typically are implemented in event-driven computer programs.

Event-driven computer programming differs from straightforward procedural programming in that in event-driven programming, there is not a linear, unbroken thread of control as is true in a procedural computer program. Instead, an event-driven program is reactive. As such, an event-driven program spends the bulk of its execution time "sleeping", waiting for an event to occur which requires a response. When an event occurs, an event-driven program "wakes up", handles the event, and goes back to sleep until the next event occurs.

In the object-oriented programming art, an object that is interested in receiving events is termed an event listener. Correspondingly, an object that generates events, known as an event notifier, maintains a list of the event listeners that are interested in being notified when events occur. The event notifier exposes methods that permit the event listeners to add themselves to this list of interested objects. When the event source generates an event, the event source notifies all the listener objects in the list that the event has occurred.

In the object-oriented programming language Java, an event handling schema can be implemented using a concrete Event class, a concrete Listener class and a concrete Notifier class. In Java, the first step in establishing event handling is to define an event listener for the object from which the event originates. An event listener can be an instance of a concrete Listener class which implements an appropriate listener interface (hereinafter "Listener Object"). A Listener Object can be the application, a container object, or an instance of the concrete Notifier class (hereinafter "Notifier Object") itself. The role of the Listener Object is to "listen for" and respond to events communicated by the Notifier Object. Notably, the Notifier Object can be the portion of the application which "sleeps" until receiving an instance of the concrete Event class (hereinafter "Event Object"). In particular, an Event Object can contain data necessary to identify and describe the externally or internally occurring event.

In Java, in order to listen for objects of a class Event, the concrete Listener class must implement the Listener interface. Each Listener interface consists of a series of methods which Listener Objects of that type must provide. Each method corresponds to a specific action to be taken in response to receiving a particular event. For example, to listen for mouse generated events such as mouse clicks or mouse movements, a Listener object must implement a mouse-specific Listener interface. Mouse-specific Listener objects that implement a mouse-specific Listener interface should implement the methods mouseclicked( ), mousepressed( ), and mouseReleased( ).

In an event-driven computer program, the Notifier Object can maintain an awareness of all Listener Objects who are "listening" for an Event Object. Responsive to receiving an Event Object, the Notifier Object can notify each Listener Object of the event. Correspondingly, the Listener Object can determine if a response is merited based on the identity of the Event Object. If the Listener Object is programmed to respond to the Event Object, the Listener Object can "handle" the occurrence of the event according to an event handling routine defined in the concrete Listener class.

Object-oriented programming languages like Java recently have been proven effective in the technology space of distributing computing. A primary principle of distributed computing includes the use of distributed objects, in which the distributed object most appropriate for performing a task is used regardless of the location of the distributed object. The concept of distributed objects combines the benefits of object-oriented programming with the benefits of distribution on a computer communications network. Popular software architectures used for implementing object distribution can include Common Object Broker Architecture (CORBA), Enterprise Java Beans (EJB) and Remote Method Invocation (RMI).

Notwithstanding, present techniques in event-driven computer programming are limited to a single address space. In particular, in the Java programming language, the Java event model is confined to a single Java Virtual Machine (JVM). Notably, the Java event model does not include a facility for notifying and receiving events across multiple JVMs distributed about a computer communications network. In fact, the Java model does not include a facility for notifying and receiving events across multiple JVMs distributed in a single computer. However, current techniques in Java-based distributed objects rarely are confined to a single JVM. Thus, there exists a need for location transparent event handling.

SUMMARY OF THE INVENTION

The present invention describes a new method for providing communications between objects executing in separate process address spaces. Distributed object-oriented programming techniques often provide for multiple objects executing remotely for one another. Objects are chosen to process tasks according to the nature of each object and the computer system in which each object executes, regardless of the location of the application. Consequently, distributed objects executing in separate process address spaces must communicate with each other. The present invention combines distributed object-oriented programming techniques with object-oriented event-driven programming techniques in order to fuse the benefits of event-driven object-oriented programming with the benefits of distributed computing.

A method for establishing a location transparent event handler can include establishing a Notifier object based upon a Notifier class in a client application for, execution in a first process address space. Significantly, in accordance with event-driven programming techniques, the Notifier object can have a list of Listener objects to be notified upon an event occurrence. Concurrently, a Listener object can be established in a server application for execution in a second process address space separate from the first process address space. Like the Notifier object, the Listener object can be based upon a Listener class. Also, in accordance with event-driven programming techniques, the Listener object can define a method to be called upon the occurrence of the event. Moreover, the Listener object can be enabled to be callable from the Notifier object.

Finally, a Listener object stub can be generated for the Listener object, wherein the Listener object stub can be configured to be added to the list of Listener objects in the Notifier object. Additionally, the Listener object stub can be further configured to remotely call the defined method in the Listener object in response to receiving notification of an event from the Notifier object. In consequence, upon the event occurrence, the Notifier object can traverse the list of Listener objects and can notify the Listener object stub of the event occurrence thereby creating a remote call to the defined method in the Listener object.

In the preferred embodiment, the Notifier and Listener classes are Java classes. As such, in the preferred embodiment, the first and second process address spaces are first and second Java Virtual Machines, respectively. A commonly used method of remote communication between Java objects is Remote Method Invocation or RMI. Thus, in the preferred embodiment, the generating step can include RMI compiling the Listener class, wherein the RMI compilation generates the Listener object stub. Furthermore, the Listener object can be registered with an RMI Registry which executes in a third Java Virtual Machine. Upon the addition the Listener object stub to the list of Listener objects, the Notifier object can retrieve a reference to the registered Listener object from the RMI Registry. Moreover, the Listener object stub can remotely call the defined method in the Listener object through the retrieved reference upon receiving notification of an event from the Notifier object.

A method for performing location transparent event handling can include creating an instance of a Notifier class in a first process address space. Notably, the Notifier instance can have a list of Listener objects to be notified upon an event occurrence. The method can also include creating an instance of a Listener class in a second process address space. The Listener class can define a method to be called upon the occurrence of the event. Also, the Listener instance can be enabled to be callable from the Notifier instance.

A Listener object stub can be inserted in the list of Listener objects in the Notifier instance in the first process address space. The Listener object stub can be configured to remotely call the defined method in the Listener instance. Subsequently, an event occurrence can be received in the Notifier instance. Responsive to receiving the event occurrence, the list of Listener objects can be traversed and the event can be passed to the Listener object stub. Consequently, a remote call to the defined method in the Listener instance can be created in the Listener object stub. In consequence, the defined method can be executed in the Listener instance.

As before, in the preferred embodiment, the Notifier and Listener classes are Java classes. As such, in the preferred embodiment, the first and second process address spaces are first and second Java Virtual Machines, respectively. Moreover, once again the Listener object stub can generated in an RMI compilation process. Subsequently, in the inserting step the Listener instance can be registered with an RMI Registry, the RMI Registry executing in a third Java Virtual Machine. Upon inserting the Listener object stub into the list of Listener objects, the Notifier instance can retrieve a reference to the registered Listener instance from the RMI Registry. When the Listener object stub remotely calls the defined method in the Listener instance, the Listener object stub can do so through the retrieved reference upon receiving the event from the Notifier instance.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

The present invention combines event-driven object-oriented programming with distributed object-oriented programming techniques to provide location transparent event handling. In a preferred embodiment of the present invention, location transparent event handling can be implemented in the Java programming language in a distributed computing environment. Notably, the location transparent event handler can permit event handling between multiple Java Virtual Machines (hereinafter JVMs) which can reside in one or more computer systems which can stand alone, or be communicatively connected to one another in a network topology. In the preferred embodiment, the JVMs reside in multiple computer systems communicatively connected across a global computer communications network, for example the Internet.

Figure 1:
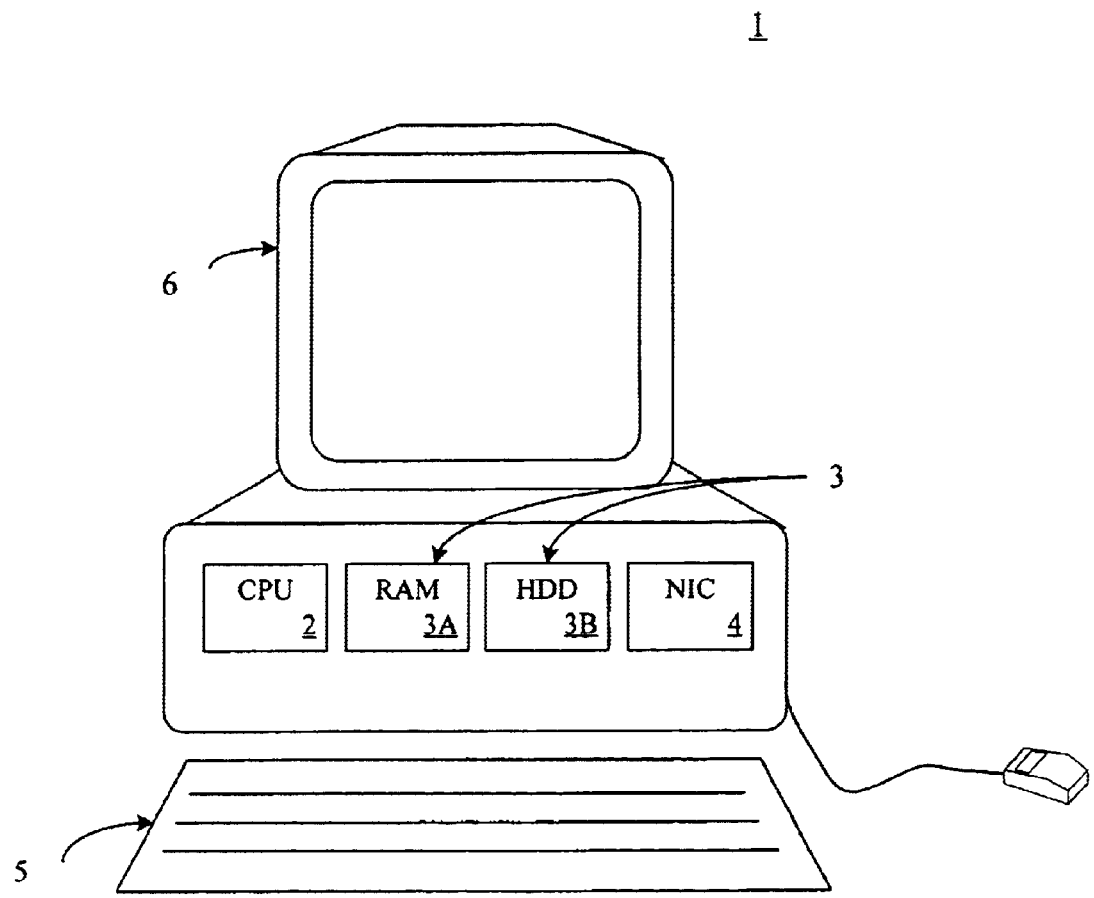
FIG. 1 is an illustration of a computer system suitable for use with the present invention.

FIG. 1 illustrates a computer system suitable for use with the present invention. As shown in FIG. 1, the computer system 1 preferably comprises therein a central processing unit (CPU) 2, and internal memory devices 3, such as a random access memory (RAM) 3A, and fixed storage 3B such as a hard disk drive (HDD). The computer system 1 can also include network interface circuitry (NIC) 4 for communicatively connecting the computer system 1 to a computer communications network. Optionally, the computer system 1 can further include a keyboard 5 and a user interface display unit 6 such as a video display terminal (VDT) operatively connected thereto for the purpose of interacting with the computer system 1. However, the invention is not limited in this regard. Rather, the computer system 1 requires neither a keyboard 5 nor a VDT 6 to operate according to the inventive arrangements.

The CPU 2 can comprise any suitable microprocessor or other electronic processing unit, as is well known to those skilled in the art. Examples of a suitable CPU can include an Intel Pentium® class processor, an IBM PowerPC® class processor or an AMD Athlon® class processor. The fixed storage 3B can store therein an operating system, for example Microsoft Windows NT®, Sun Solaris®) or Debian Linux. In the preferred embodiment, the method of the invention can be implemented using development tools designed for use with any of the above-referenced operating systems. For instance, where the method of the invention is implemented in the Java programming language, the Java Software Development Kit (hereinafter SDK) can be used to implement the method of the invention.

Figure 2:
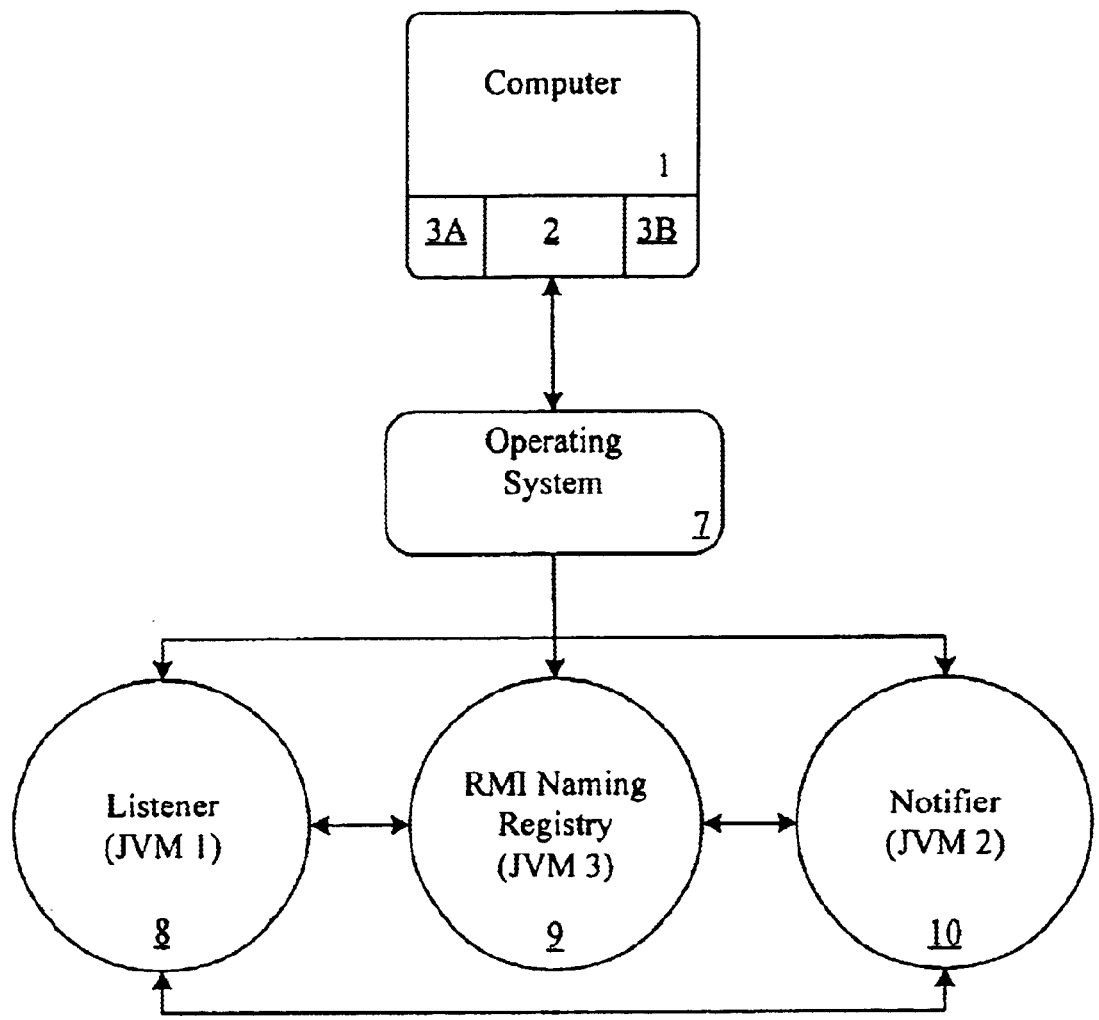
FIG. 2 is a schematic diagram of a computer architecture for use in the computer system of FIG. 1 suitable for use with the present invention.

FIG. 2 illustrates a typical architecture for the computer system 1 in which at least a portion of the location transparent event handler can reside. Specifically, as shown in FIG. 2, the transparent event handler can be implemented across three JVMs 8, 9, 10. Only one JVM, however need reside in any one computer. That is, each JVM can reside in a separate computer system and communicate with each other using well-known interprocess communication techniques, for example TCP/IP. Still, the invention in not limited with regard to the number of computer systems required to host the JVMs of the present invention. Rather, all three JVMs can reside and execute in separate address spaces in a single computer or in separate address spaces in is several computers. For the purpose of simplicity, however, all three JVMs are illustrated in FIG. 2 as residing in separate address spaces in a single computer system 1.

Advantageously, Java applications executing in JVMs can communicate with other Java applications executing in other remote JVMs. This remote communication capability can be facilitated through the distributed object architecture known as Remote Method Invocation (hereinafter "RMI"). RMI, first introduced in version 1.1 of the Java Development Kit (hereinafter "JDK"), has been significantly upgraded under the Java 2 SDK. Presently, the RMI architecture defines how objects behave, how and when exceptions can occur, how memory is managed, and how parameters are passed to, and returned from, remote methods. The RMI architects designed RMI to make using distributed Java objects similar to using local Java objects.

In RMI, the definition of a remote service is coded using a Java interface. The implementation of the remote service is coded in a class. Therefore, the key to understanding RMI is to remember that interfaces define behavior and classes define implementation. Notably, Java interfaces do not contain executable code. Rather, classes which implement interfaces contain the executable code. RMI supports two classes that implement the same interface. The first class is the implementation of the behavior and it executes in the server. The second class acts as a proxy for the remote service and it executes on the client. In operation, when a client program invokes method calls on the proxy object, RMI sends the request to the remote JVM, and forwards it to the implementation. Any return values provided by the implementation are sent back to the proxy and then to the client's program.

The RMI implementation is essentially built from three abstraction layers. The first is the Stub and Skeleton layer, which lies just beneath the view of the developer. This layer intercepts method calls made by the client to the interface reference variable and redirects these calls to a remote RMI service. The next layer is the Remote Reference Layer. This layer understands how to interpret and manage references made from clients to the remote service objects. In JDK 1.1, the Remote Reference Layer connects clients to remote service objects that are running and exported on a server. The connection is a one-to-one, unicast link. In the Java 2 SDK, the Remote Reference Layer has been enhanced to support the activation of dormant remote service objects through a Remote Object Activation facility.

The transport layer is based on TCP/IP connections between JVMs executing on computer systems communicatively connected in a network. The transport layer can provide basic connectivity, as well as some firewall penetration strategies. By using a layered architecture each of the layers could be enhanced or replaced without affecting the rest of the system. For example, the transport layer could be replaced by a UDP/IP layer without affecting the upper layers.

The Stub and Skeleton layer of RMI lie just beneath the view of the Java developer. In this layer, RMI uses the well-known Proxy design pattern as described in Gamma, Helm, Johnson and Vlissides, *Design Patterns*, at 207–217 (Addison-Wesley Professional Computing Series 1995) and incorporated herein by reference. In the Proxy pattern, an object in one context is represented by another (the proxy) in a separate context. The proxy knows how to forward method calls between the participating objects. In RMI, the stub class is the proxy, and the remote service implementation class is the actual subject. A skeleton is a helper class that is generated for RMI to use. The skeleton understands how to communicate with the stub across the RMI link. The skeleton carries on a conversation with the stub. The skeleton reads the parameters for the method call from the link, makes the call to the remote service implementation object, accepts the return value, and writes the return value back to the stub.

The Remote Reference Layer defines and supports the invocation semantics of the RMI connection. The Remote Reference Layer provides a RemoteRef object that represents the link to the remote service implementation object. The stub objects use the invokes method in RemoteRef to forward the method call. The RemoteRef object understands the invocation semantics for remote services. The JDK 1.1 implementation of RMI provides only one way for clients to connect to remote service implementations: a unicast, point-to-point connection. Before a client can use a remote service, the remote service must be instantiated on the server and exported to the RMI system. Additionally, if the remote service is the primary service, it must also be named and registered in the RMI Registry.

The Java 2 SDK implementation of RMI adds a new semantic for the client-server connection. In this version, RMI supports activatable remote objects. When a method call is made to the proxy for an activatable object, RMI determines if the remote service implementation object is dormant. If it is dormant, RMI will instantiate the object and restore its state from a disk file. Once an activatable object is in memory, it behaves just like JDK 1.1 remote service implementation objects. Other types of connection semantics are possible. For example, with multicast, a single proxy could send a method request to multiple implementations simultaneously and accept the first reply thereby improving response time and availability.

The Transport Layer makes the connection between JVMs. All connections are stream-based network connections that use TCP/IP. Even if two JVMs are running on the same computer system, the JVMs connect through host computer system TCP/IP network protocol stack. As is well known in the art, TCP/IP provides a persistent, stream-based connection between two machines based on an IP address and port number at each end. Preferably, a DNS name is used instead of an IP address. In the current release of RMI, TCP/IP connections are used as the foundation for all JVM-to-JVM connections.

On top of TCP/IP, RMI uses a wire level protocol referred to as Java Remote Method Protocol (hereinafter JRMP). JRMP is a stream-based protocol which has been specified in two versions. A first version, released with the JDK 1.1 version of RMI requires the use of Skeleton classes on the server. A second version, released with the Java 2 SDK, has been optimized for performance and does not require skeleton classes. Notably, a next-generation version of RMI, referred to as RMI-IIOP, is included as part of the Java 2 SDK version 1.3. In RMI-IIOP, instead of using JRMP, the Object Management Group Internet Inter-Object Request Broker Protocol (hereinafter IIOP) is used for communications between clients and servers. Notably, CORBA Object Request Broker clients and servers communicate with each other using IIOP. Thus, with the adoption of an Objects-by-Value extension to CORBA and the proposed mapping of Java to IDL, the ground work has been set for direct RMI to CORBA integration.

Client applications executing in a JVM can locate a remote service executing in another JVM through the use of a naming or directory service. A naming or directory service can execute in a known host through a known port. RMI can use several different directory services, including the Java Naming and Directory Interface (hereinafter "JNDI"). RMI further includes a simple naming service referred to as the RMI Naming Registry, "rmiregistry". The RMI Naming Registry executes in each computer system which hosts remote service objects and accepts queries for services, by default on port 1099.

In operation, on a host computer system, a server application can create a remote service first by creating a local service object that implements that service. Subsequently, the server can export the local service object to RMI using the export utility "rmic". Once the local service object has been exported, the server can register the local service object in the RMI Naming Registry under a publically known name. Subsequently, RMI can create a listening service that simply waits for clients to connect and request the service. Subsequently, on the client side, the RMI Naming Registry can be accessed through the static class "Naming". The static class Naming provides the method "lookups" which can be invoked by a client application in order to query the registry. Specifically, lookups can accept a uniform resource locator (hereinafter "URL") which can specify a server host name and the name of the desired service. In response, lookup( ) can return a remote reference to the service object. The URL can take the form as follows: rmi://<host_name>[:<name_service_port>]/<service_name> where the host_name is a name recognizable on a local area network or a DNS name recognizable on the Internet. The name_service_port need be specified only if the naming service is executing on a port different than the default port 1099.

Returning now to FIG. 2, in the preferred embodiment, the object-oriented architecture of an object-oriented event-driven program consisting of at least one Listener object and a Notifier object is combined with the RMI object-oriented architecture including an RMI Naming Registry in order to produce a location transparent event handler. Each of the Listener object and the Notifier object can be implemented in Java and executed in a separate JVMs 8, 10 executing on top of the operating system 7. As discussed above, however, each of the Listener object, the Notifier object and the RMI Naming Registry can execute in JVMs executing on top of operating systems in separate computer systems rather than a single computer system 1 as shown in FIG. 2.

Figure 3:
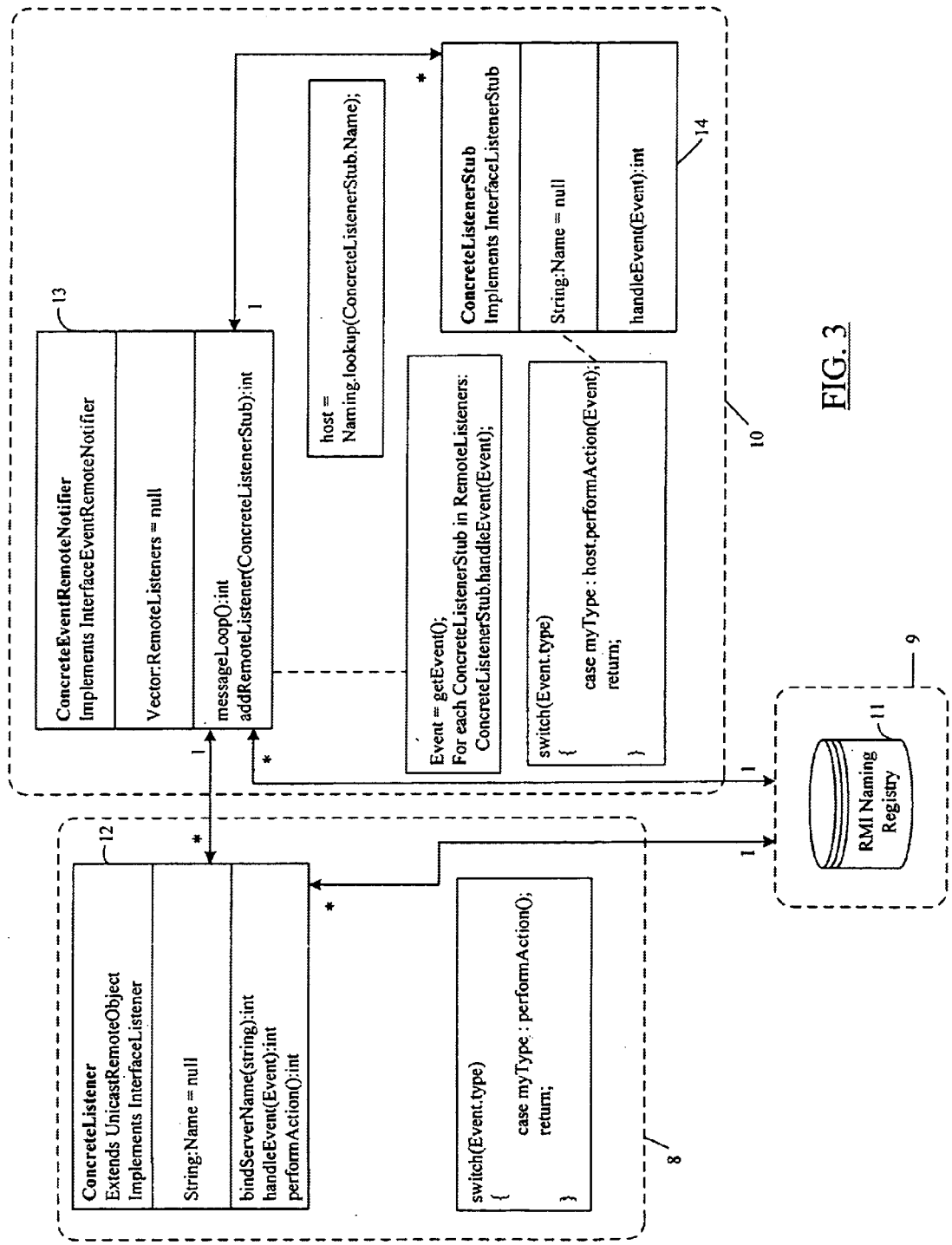
FIG. 3 is a class diagram illustrating location transparent event handling in a Java event model using Java-based Remote Method Invocation.

FIG. 3 is a class diagram illustrating location transparent event handling in a Java event model using Java-based Remote Method Invocation. Location transparent event handling incorporates an RMI architecture in an object-oriented event-driven program in which one application is a server executing in one JVM, and another application is a client executing in another, different JVM. Prior to run-time, the server is subjected to RMI compilation in which stubs and corresponding skeletons are generated, wherein the stubs reside in the client application and the skeletons reside in the server. The RMI compilation can be accomplished using the standard Java utility "rmic". At run-time, the RMI server can register its presence with an RMI Registry, shown in FIG. 3 as RMI Naming Registry 11. Subsequently, RMI clients can connect to the server application by locating the server application in the RMI Registry by name. Once connected, the client application can call published remote methods in the RMI server as if calling those methods locally.

As shown in FIG. 3, a concrete Listener class 12 can implement a Listener interface for execution in a first JVM 8. In the preferred embodiment, the Listener interface typically used in an event-driven program is modified to extend java.rmi.Remote. In addition, the concrete Listener class 12 which implements the modified Listener interface is enabled to be callable from a remote application executing in a different JVM when an event occurs in the remote application. This can be accomplished by creating an RMI server in the concrete Listener class 12 for the purpose of receiving remote event notification. Thus, the concrete Listener class 12 can extend java.rmi.server.UnicastRemoteObject.

In the RMI architecture, each method which can be called remotely must throw a java.rmi.RemoteException exception. Hence, the Listener interface must include a modified prototype for the remote event handling routine, "handleEvent(Event)" in order includes functionality to throw a java.rmi.Remote Exception. Notably, in the context of an RMI architecture, Listener objects based on the concrete Listener class 12 are server applications. Hence, upon RMI compilation, a skeleton 14 can be generated based on the concrete Listener class 12.

Like the concrete Listener class 12, a concrete Notifier class 13 can implement a Notifier interface for execution in a third JVM 10. A Notifier object based on the concrete Notifier class 13 can notify remote Listener objects when an event occurs. A Notifier object based on the concrete Notifier class 13 can permit a Listener object to register itself with the Notifier object by adding itself to a list of Listener objects to be notified upon the occurrence of an event by using the method "addRemoteListener".

However, unlike traditional event-driven architectures, in the present invention, the reference to a listener which can be registered with the Notifier object actually is a reference to a listener stub, generated during the RMI compilation of the concrete Listener class 12. Thus, the Listener objects in the list are remote client stub Listener objects that implement the modified Listener interface. At run-time, when a remote Listener object is added to the list, the Notifier object can query the RMI Naming Registry 11 in the second JVM 9 for the stub reference object and can store the reference in the Listener stub. For example, as shown in FIG. 3, the reference can be retrieved and stored using the Java statement host=Naming.lookup(ConcreteListenerStub.Name). Subsequently, when an event occurs, the Notifier object can traverse the list and, instead of passing the event to a local Listener object, the Notifier object can pass the event to the Listener stub thereby creating a remote call to the client listener RMI server in the first JVM 8 through the stored reference. For example, as shown in FIG. 3, the remote call can be generated using the Java statement host.performAction(Event).

In consequence, the location transparent event handler provides a solution to the aforementioned remote event handling problem. Specifically, the present invention provides the ability to notify and listen for remote events while simultaneously using a standard event-driven model. As such, the present invention facilitates the implementation of distributed object-oriented programming. Notably, the spirit of the present invention is not limited to any embodiment described above. Rather, the details and features of an exemplary embodiment were disclosed as required. Without departing from the scope of this invention, other modifications will therefore be apparent to those skilled in the art. Thus, it must be understood that the detailed description of the invention and drawings were intended as illustrative only, and not by way of limitation.

What is claimed is:

1. A method for establishing a location transparent event handler comprising the steps of:

establishing a Notifier object in a client application for execution in a first process address space, said Notifier object based upon a Notifier class, said Notifier object having a list of Listener objects to be notified upon an event occurrence;

establishing a Listener object in a server application for execution in a second process address space separate from said first process address space, said Listener object based upon a Listener class, said Listener object defining a method to be called upon the occurrence of said event, said Listener object enabled to be callable from said Notifier object; and, generating a Listener object stub for said Listener object, said Listener object stub disposed in said first process address space configured to be added to said list of Listener objects in said Notifier object, said Listener object stub further configured to call said defined method in said Listener object by utilizing a reference to the Listener object stub that is retrieved from a third process address space that in turn calls the defined method in said Listener object, whereby upon said event occurrence, said Notifier object can traverse said list of Listener objects and can notify said Listener object stub of said event occurrence thereby creating a remote call to said defined method in said Listener object.

2. The method of claim 1, wherein said Notifier and Listener classes are Java classes and said first and second process address spaces are in first and second Java Virtual Machines, respectively.

3. The method of claim 2, wherein said generating step comprises the steps of:

RMI compiling said Listener class, said RMI compilation generating said Listener object stub; and, registering said Listener object with an RMI Registry, said RMI Registry executing in a third Java Virtual Machine, said Notifier object retrieving a reference to said registered Listener object from said RMI Registry upon said addition said Listener object stub to said list of Listener objects, said Listener object stub remotely calling said defined method in said Listener object through said retrieved reference upon receiving notification of an event from said Notifier object.

4. A method for performing location transparent event handling comprising the steps of:

creating an instance of a Notifier class in a first process address space, said Notifier instance having a list of Listener objects to be notified upon an event occurrence;

creating an instance of a Listener class in a second process address space, said Listener instance having a method to be called upon the occurrence of said event, said Listener instance enabled to be callable from said Notifier instance, wherein said Notifier instance and said Listener instance are configured to perform location transparent event handling;

inserting a Listener object stub in said list of Listener objects in said Notifier instance is said first process address space, said Listener object stub configured to call said defined method in said Listener instance by utilizing a reference to the Listener object stub that is retrieved from a third process address space that in turn calls the defined method in said Listener instance;

receiving an event occurrence in said Notifier instance; and responsive to receiving said event occurrence, traversing said list of Listener objects, passing said event to said Listener object stub, creating in said Listener object stub a remote call to said defined method in said Listener instance, and executing said defined method in said Listener instance.

5. The method of claim 4, wherein said Notifier and Listener classes are Java classes and said first and second process address spaces are in first and second Java Virtual Machines, respectively.

6. The method of claim 5, wherein said Listener object stub is generated in an RMI compilation process.

7. The method of claim 6, wherein said inserting step further comprises the step of:

registering said Listener instance with an RMI Registry, said RMI Registry executing in a third Java Virtual Machine, said Notifier instance retrieving a reference to said registered Listener instance from said RMI Registry upon inserting said Listener object stub to said list of Listener objects.

8. The method of claim 7, wherein said step of creating in said Listener object stub remotely calls said defined method in said Listener instance through said retrieved reference upon receiving said event from said Notifier instance.

9. A machine readable storage, having stored thereon a computer program having a plurality of code sections for establishing a location transparent event handler, said code sections executable by a machine for causing the machine to perform the steps of:

establishing a Notifier object in a client application for execution in a first process address space, said Notifier object based upon a Notifier class, said Notifier object having a list of Listener objects to be notified upon an event occurrence;

establishing a Listener object in a server application for execution in a second process address space separate from said first process address space, said Listener object based upon a Listener class, said Listener object defining a method to be called upon the occurrence of said event, said Listener object enabled to be callable from said Notifier object; and, generating a Listener object stub for said Listener object, said Listener object stub disposed in said first process address space configured to be added to said list of Listener objects in said Notifier object, said Listener object stub further configured to call said defined method in said Listener object by utilizing a reference to the Listener object stub that is retrieved from a third process address space that in turn calls the defined method in said Listener object, whereby upon said event occurrence, said Notifier object can traverse said list of Listener objects and can notify said Listener object stub of said event occurrence thereby creating a remote call to said defined method in said Listener object.

10. The machine readable storage of claim 9, wherein said Notifier and Listener classes are Java classes and said first and second process address spaces are in first and second Java Virtual Machines, respectively.

11. The machine readable storage of claim 10, wherein said generating step comprises the steps of:

RMI compiling said Listener class, said RMI compilation generating said Listener object stub; and, registering said Listener object with an RMI Registry, said RMI Registry executing in a third Java Virtual Machine, said Notifier object retrieving a reference to said registered Listener object from said RMI Registry upon said addition said Listener object stub to said list of Listener objects, said Listener object stub remotely calling said defined method in said Listener object trough said retrieved reference upon receiving notification of an event from said Notifier object.

12. A machine readable storage, having stored thereon a computer program having a plurality of code sections for performing location transparent event handling, said code sections executable by a machine for causing the machine to perform the steps of:

creating an instance of a Notifier class in a first process address space, said Notifier instance having a list of Listener objects to be notified upon an event occurrence;

creating an instance of a Listener class in a second process address space, said Listener instance having a method to be called upon the occurrence of said event, said Listener instance enabled to be callable from said Notifier instance, wherein said Notifier instance and said Listener instance are configured to perform location transparent event handling;

inserting a Listener object stub in said list of Listener objects in said Notifier instance is said first process address space, said Listener object stub configured to call said defined method in said Listener instance by utilizing a reference to the Listener object stub that is retrieved from a third process address space that in turn calls the defined method in said Listener instance;

receiving an event occurrence in said Notifier instance; and responsive to receiving said event occurrence, traversing said list of Listener objects, passing said event to said Listener object stub, creating in said Listener object stub a remote call to said defined method in said Listener instance, and executing said defined method in said Listener instance.

13. The machine readable storage of claim 12, wherein said Notifier and Listener classes are Java classes and said first and second process address spaces are in first and second Java Virtual Machines, respectively.

14. The machine readable storage of claim 13, wherein said Listener object stub is generated in an RMI compilation process.

15. The machine readable storage of claim 14, wherein said inserting step further comprises site step of:

registering said Listener instance with an RMI Registry, said RMI Registry executing in a third Java Virtual Machine, said Notifier object retrieving a reference to said registered Listener object from said RMI Registry upon inserting said Listener object stub to said list of Listener objects.

16. The machine readable storage of claim 15, wherein said step of creating in said Listener object stub remotely calls said defined method in said Listener instance through said retrieved reference upon receiving said event from said Notifier instance.

* * * * *